United States Patent
Raith et al.

(10) Patent No.: US 8,516,323 B2
(45) Date of Patent: Aug. 20, 2013

(54) REPAIR FUNCTION FOR A BROADCAST SERVICE

(75) Inventors: Alex Krister Raith, San Diego, CA (US); Olle Franceschi, Landskrona (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1914 days.

(21) Appl. No.: 11/098,292

(22) Filed: Apr. 4, 2005

(65) Prior Publication Data
US 2005/0246417 A1    Nov. 3, 2005

Related U.S. Application Data

(60) Provisional application No. 60/559,739, filed on Apr. 5, 2004.

(51) Int. Cl.
 G06F 11/00    (2006.01)
 G08C 25/02    (2006.01)
 H04L 1/18     (2006.01)
 H03M 13/00    (2006.01)

(52) U.S. Cl.
 USPC ............................ 714/748; 714/708; 714/774

(58) Field of Classification Search
 USPC .......................................... 714/708, 748, 774
 See application file for complete search history.

(56) References Cited

U.S. PATENT DOCUMENTS

| | | | | |
|---|---|---|---|---|
| 3,372,376 A | * | 3/1968 | Helm | 714/774 |
| 3,643,027 A | * | 2/1972 | Goldberg | 714/704 |
| 4,344,171 A | * | 8/1982 | Lin et al. | 714/751 |
| 4,660,202 A | * | 4/1987 | Woodsum | 714/804 |
| 5,444,718 A | * | 8/1995 | Ejzak et al. | 714/748 |
| 5,600,663 A | * | 2/1997 | Ayanoglu et al. | 714/774 |
| 5,691,992 A | * | 11/1997 | Molnar et al. | 714/752 |
| 5,757,813 A | * | 5/1998 | Raith | 714/708 |
| 5,901,160 A | * | 5/1999 | Abe et al. | 714/774 |
| 6,519,223 B1 | | 2/2003 | Wager et al. | |

FOREIGN PATENT DOCUMENTS

EP    1 043 901    10/2000

OTHER PUBLICATIONS

International Business Machines Corporation: "Packet length based filtering and queuing in communication" Research Disclosure, Kenneth Mason Publications, Westbourne, GB, vol. 452, No. 84, Dec. 2001, XP007129439.

"3$^{rd}$ Generation Partnership Project; Technical Specification Group Services and System Aspects; Multimedia Broadcast/Multi Service; Protocols and Codecs (Release 6);" 3GPP TS 26.346 V1.5.0 (Nov. 2004), 63 pages.

"3$^{rd}$ Generation Partnership Project; Technical Specification Group Services and System Aspects; Multimedia Broadcast/Multicast Service; MBMS User Service Guidelines (Release 6) TSG-SA4 PSM SWG internal working draft;" 3GPP TR 26.946 V0.0.2 (yyyy-mm), 15 pages.

* cited by examiner

*Primary Examiner* — Joseph D Torres
(74) *Attorney, Agent, or Firm* — Coats and Bennett, P.L.L.C.

(57) ABSTRACT

A mobile station downloading an object over a broadcast channel uses a repair service to obtain data that was received in error during the original broadcast. The mobile station sets a repair threshold for the download object and invokes repair if the amount of errors is less than the repair threshold. If the amount of errors exceeds the repair threshold, the mobile station treats the download attempt as having failed and may send a new request if download is still desired.

58 Claims, 4 Drawing Sheets

REPAIR FUNCTION FOR A BROADCAST SERVICE

RELATED APPLICATIONS

This application claims priority to Provisional U.S. Patent Application 60/559,739 filed Apr. 5, 2004; which is incorporated herein by reference.

BACKGROUND OF THE INVENTION

The present invention generally relates to broadcast and multicast services for wireless communication networks, and more particularly, to repair services for broadcast and multicast services.

In wireless communication networks, the harsh conditions of the radio communication channel cause errors during transmission of data. Various mechanisms exist to detect and/or correct transmission errors. These techniques include forward error correcting (FEC) codes and automatic repeat request (ARQ) protocols. Both FEC and ARQ operate by adding redundancy to the original information bits to enable detection and/or correction of transmission errors by the mobile station. FEC codes allow the mobile station to correct transmission errors, but the redundant bits reduce the gross bit rate of transmission. An advantage of FEC codes is that no retransmission of information is required to correct errors that occur during transmission unless the error correcting capability of the FEC code is exceeded, and no uplink channel is needed for signaling between the mobile station and the base station. ARQ protocols enable the mobile station to detect frame errors with less redundancy so that a mobile station can request retransmission of incorrectly received frames. Unlike FEC codes, ARQ protocols require an uplink channel for sending retransmission requests. Further, retransmission of missing data consumes bandwidth on the downlink.

A repair service can be used to provide mobile stations with data that was not correctly received in the original transmission. A repair service is similar to ARQ but uses a dedicated point-to-point (PTP) channel to retransmit incorrectly received data rather than a broadcast channel. A mobile station reports missing segments (e.g., blocks, frames, packets, etc.) to initiate a repair transaction. The mobile station typically sends its repair request after download of the data object is completed. The server then retransmits the missing packets to the mobile station. The repair service uses a PTP uplink and downlink channel for each mobile station. The PTP uplink and downlink channels may be a "shared" channel or "packet based" channel, however, the information transmitted over the PTP channel is specific for each mobile station.

SUMMARY OF THE INVENTION

A mobile station downloading an object over a broadcast channel uses a repair service to obtain data that was received in error during the original broadcast. The mobile station sets a repair threshold for the download object and invokes segment-based repair if the number of errors is less than the repair threshold. If the number of errors exceeds the repair threshold, the mobile station treats the download attempt as having failed. The user may be given the option to initiate a PTP transaction to download the object.

The mobile station may, before the download is complete, predict whether the download will succeed or fail based on a error metric. If the mobile station predicts that the download will fail, the mobile station can abort the download and save power. The prediction of a download failure may include an error margin so that downloads are not aborted prematurely when there is still a chance that the download will succeed. The error margin can be adaptable. In some embodiments, the error margin may be adjusted depending on the progress of the download. In other embodiments, the error margin may be adjusted depending on channel conditions.

DETAILED DESCRIPTION OF THE INVENTION

Figure 1:
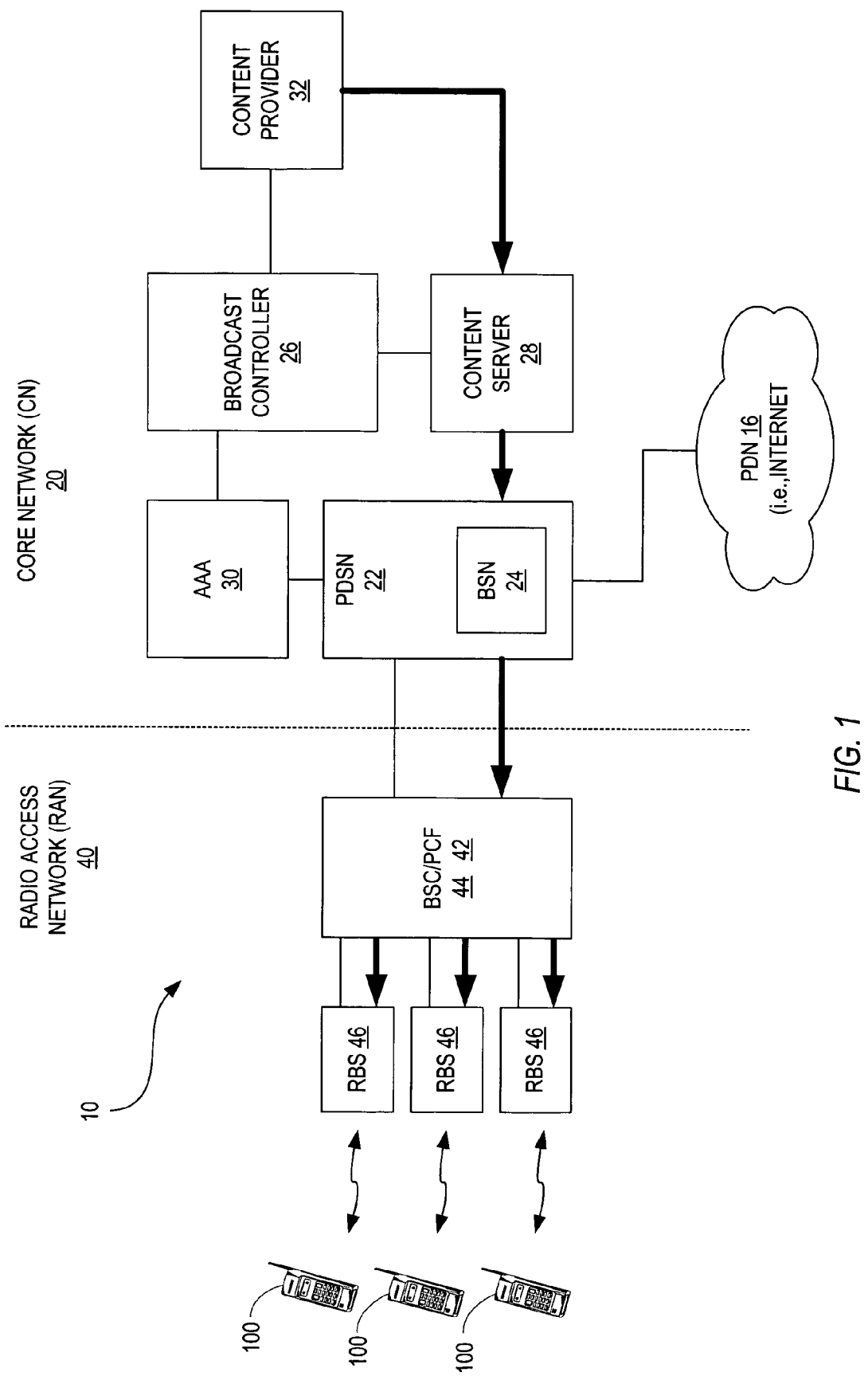
FIG. 1 illustrates an exemplary wireless communication network.

FIG. 1 illustrates logical entities of an exemplary wireless communication network 10 that provides broadcast/multicast services to mobile stations 100. The terms broadcast and multicast are used herein interchangeably to mean a point-to-multipoint (PTM) transmission from a single source to multiple receivers. In the cdma2000 standard being developed by 3GPP2 standards organization, broadcast services are referred to as Broadcast/Multicast Services (BCMCS). In Wideband CDMA and GSM standard being developed by the 3GPP standards organization, broadcast services are called Multimedia Broadcast Multicast Services (MBMS). The wireless communication network 10 may be any type of wireless communication network, such as a CDMA network, WCDMA network, GSM/GPRS network, Digital Video Broadcasting (DVB and DVB-H) network, or WIMAX network (IEEE 802.16d-2004). FIG. 1 illustrates a network 10 configured according to the cdma2000 broadcast-multicast air interface standard (TIA-1006). Wireless communication network 10 comprises a packet-switched core network 20 and a radio access network (RAN) 40. The core network 20 connects to one or more external packet data networks 16, such as the Internet, or to other wireless communication networks. The RAN 40 connects to the core network 20 and serves as the access point for mobile station 100.

The core network 20 includes a packet data serving node (PDSN) 22, a broadcast serving node (BSN) 24, a broadcast controller 26, a content server 28, and an authentication, authorization and accounting server (AAA) 30. The core network 20 may further include a content provider 32; however, those skilled in the art will understand that the content provider 32 may reside outside of the core network 20.

The PDSN 22 connects to an external packet data network (PDN) 60, such as the Internet, and supports PPP connections to and from the mobile station 100. It adds and removes IP streams to and from the RAN 40 and routes packets between the external packet data network 16 and the RAN 40. The BSN 24, which may be incorporated into the PDSN 22, connects to the content server 28 and supports broadcast streams to and from the mobile station 100. It adds and removes broadcast streams to and from the RAN 30. The functions of the BSN 24 may be incorporated into the PDSN 22 if desired.

Broadcast controller 26 is responsible for managing and providing session information to the BSN 24, content server 28, RAN 40, and the mobile station 100. The content server 28 is the logical entity that makes broadcast content available to mobile station 100. The Convent Server 28 is not necessarily the source of the content but may receive the content from a content provider 32. It may store and forward content from the content provider 32, or may merge content from multiple content providers 32. If encryption is used, the content server 28 may encrypt the content. It may also reformat content for delivery to the mobile station 100.

The AAA 30 is responsible for authentication, authorization and accounting functions. It accesses a subscriber profile database (not shown) to obtain information from a user's subscription profile, and may send the user subscription profile to the content server 28.

The content provider 32 is the source of content carried by a broadcast stream. The broadcast content may comprise a real-time broadcast or a stored broadcast program, e.g. video on demand. The content provider 32 may be a server within the serving network, in a mobile station's home network, or in an external PDN such as the Internet. If the content provider 32 is outside the network, the content provider 32 packetizes the broadcast content for delivery over the IP network to the content server 28 in the core network 20, which makes the content available to mobile station 100 within the wireless communication network 10.

The RAN 40 includes a packet control function (PCF) 42, a base station controller (BSC) 44 and one or more radio base stations (RBSs) 46. The primary function of the PCF 32 is to establish, maintain, and terminate connections to the PDSN 22. The BSCs 44 manage the radio resources within their respective coverage areas. The RBSs 36 communicate over the air interface with mobile station 100. An exemplary air interface specification for providing broadcast services is described in the Third Generation Partnership Project 2 (3GPP2) specification titled *CDMA High Rate Broadcast-Multicast Packet Data Air Interface Specification*, Version 1.0 (February 2004)(the *BCMCS Air Interface Specification*) (TIA-1006), which is incorporated herein by reference. A BSC 44 can manage more than one RBSs 46. In cdma2000 networks, the BSC 44 and an RBS 46 comprises a base station 50. In cdma2000 networks, a single BSC 44 may comprise part of multiple base stations 50. In other network architectures based on other standards, the network components comprising the base station 50 may be different but the overall functionality will be the same or similar.

Broadcast services provide the ability to transmit the same information stream, referred to herein as a broadcast stream, to multiple users simultaneously. Broadcast services can be broadly classified as either broadcast download services or broadcast streaming services. A broadcast download service is typically used to download files or objects, such as a purchased music or video files or executable computer files, for storage in the mobile station. With broadcast download services, the user must typically wait for the entire file to be downloaded before the object can be played or otherwise used. From the end user perspective, it may be important that the entire file be delivered without error. In contrast, broadcast streaming services are typically used for streaming media objects, e.g. audio or video, for immediate playback. Some transmission errors may be tolerated. Those skilled in the art will recognize that some files or objects, such as MP3 music files, may be delivered using both download or streaming delivery methods.

Broadcast services may be delivered over two types of bearer channels, referred to herein as broadcast channels and point-to-point (PTP) channels. Broadcast channels provide efficient one-to-many delivery of a broadcast stream to a group of users. PTP channels can also be used to deliver broadcast content to a single user and for repair services. A point-to-multipoint (PTM) channel may also be used for repair services.

In wireless communication networks, the communication channel causes errors during transmission of data. Some transmission errors that may be tolerated for broadcast streaming services, may be unacceptable for broadcast download services. Various mechanisms exist to reduce transmission errors and improve reliability of broadcast services. These techniques include forward error correcting (FEC) codes and automatic repeat request (ARQ).

FEC codes operate by adding redundancy to the original information bits according to a FEC code. The redundant bits enable a mobile station with knowledge of the FEC code to detect and correct errors that occur during transmission. An advantage of FEC codes is that no retransmission of information is required to correct errors that occur during transmission unless the error correcting capability of the FEC code is exceeded. The trade-off is that the redundant bits reduce the effective bit-rate of the transmission and increases the amount of time needed to transmit the data.

ARQ protocols add redundancy to enable detection of errors at the mobile station. Typically, data is segmented into frames that are protected by a cyclic redundancy check (CRC) or other frame check. As the frames are received, the mobile station performs a CRC check to detect errors. If a frame is received in error, the mobile station can request retransmission of the frame by sending a retransmission request over an overhead channel identifying the incorrectly received frame. ARQ may require less redundancy than FEC. However, an uplink channel is needed to send the retransmission requests to the content server 28. The amount of feedback is dependent on the number of transmission errors and the number of users. For broadcast services, there may be many users providing concurrent feedback, which may result in congestion on the uplink channel and reduce capacity for other services, particularly when a large number of errors occur. In some circumstances, a mobile station may request retransmission of almost an entire download object due to a large number of errors.

One technique, referred to herein as Broadcast ARQ, combines FEC and ARQ protocols to provide reliable delivery of broadcast content. A large source object may be partitioned into source blocks. The source block is encoded using an FEC code, such as a Reed Solomon code. Following FEC encoding, the source blocks are further divided into source packets that may contain an information part and a redundant part, only an information part, or only a redundant part. The source packets are protected by a frame check sequence, such as a cyclic redundancy check code and transmitted. The mobile station checks the source packets for errors as the source packets are received. If a source packet is received in error, the mobile station may request retransmission of the source packet. Based on the feedback from all of the mobile stations, the content server 28 determines the maximum number of additional source packets needed by any of the mobile stations to correctly decode the source block and generates that number of additional source packets for transmission to all of the mobile stations. If there are no losses in the retransmission, all of the mobile stations will be able to correctly decode the source block.

In broadcast environments where ARQ is either costly or for other reasons is not feasible, a Data Carousel approach can be used to improve reliability. The Data Carousel approach is described in "Methods and networks for coding of broadcast messages" U.S. Pat. No. 6,498,936, which is incorporated by reference. An example of an application utilizing a data carousel is a 'ticker-tape' type service in which the data is provided to the user repetitively and updated at certain times to reflect changing circumstances. A data carousel lets the transmitter cycle through and transmit the source data a predetermined number of times. If a mobile station misses a packet in one cycle, it can receive the missing packet in a later cycle.

The data carousel technique can be combined with FEC. The transmitter may partition the data into multiple source blocks if the source object is rather large. Each such block may be organized into rows and columns. The FEC encoder may use a block code (e.g. Reed Solomon) where each column is encoded and the redundancy generated is put in extra rows. The transmitter sends the data row by row. Each row may be further segmented into source packets that may be subject to further FEC encoding. The latter encoding is referred to as the inner code (most close to the transmission channel) and the first instance of encoding is referred to as the outer code. the previously mentioned U.S. Pat. No. 6,498,936 describes a method of outer and inner coding that can be adapted for use in the present invention. The source packet typically includes a frame check sequence (e.g., CRC) that informs the mobile station whether the packets are correctly received (after optional inner decoding). The mobile station may store correctly received packets from each instance of transmission until there are a sufficient number of correct frames to decode the entire source block. Once the critical number of correct source packets is received, the mobile station can reconstruct all the data for the outer FEC encoding block. However, cycling through data rather then using a single transmission instance of the FEC blocks with more redundancy effectively limits the data rate or throughput but may be less complex than the single more powerful FEC encoding method.

The Broadcast ARQ and Data Carousel techniques described may not result in error-free delivery of all source packets of a data object. In some cases, the amount of data that is not correctly received can be large despite the use of these techniques. A repair service can be used to provide mobile stations with the missing segments, i.e. segments that are not correctly received. A repair service typically uses a dedicated PTP channel to retransmit incorrectly received segments rather than a broadcast channel, but may also use a PTM channel. A mobile station reports missing segments (e.g., blocks, rows, packets, etc.) to initiate a repair transaction. The mobile station typically sends its report after download of the data object is completed. The transmitter then retransmits the missing segments to the mobile station. The repair service uses PTP uplink and downlink channels for each mobile station. The PTP uplink and downlink channels may be a "shared" channel or "packet based" channel, however, the information transmitted over the PTP channel is specific for each mobile station. Because a form of ARQ is used, repair services can be used to ensure delivery of all data segments.

Figure 2:
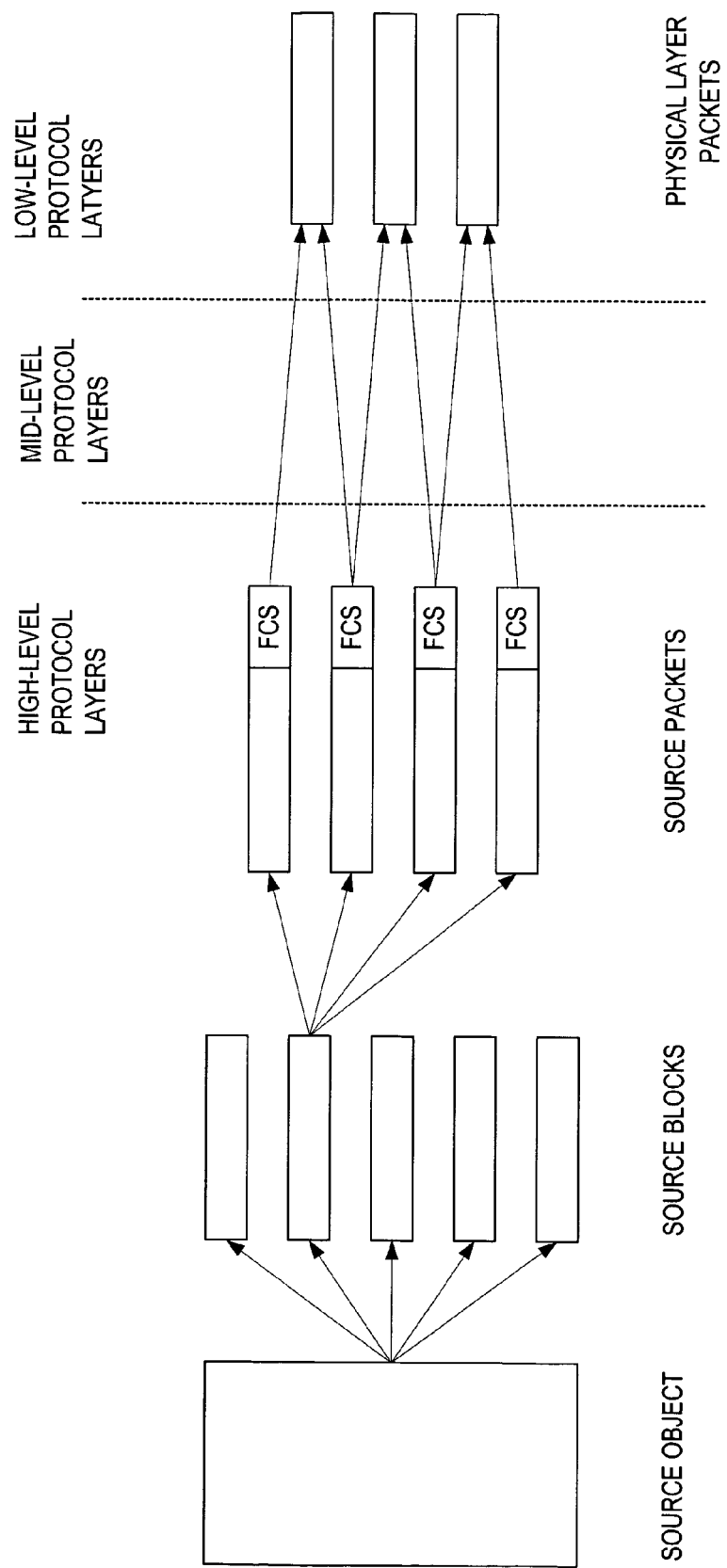
FIG. 2 illustrates an exemplary method of segmenting a broadcast stream for transmission.

FIG. 2 illustrates a generalized set of exemplary broadcast protocols for delivery of download broadcast services from a content provider to a mobile station. As shown in FIG. 2, a data object is divided at the application level into a plurality of source blocks. The source blocks are encoded using an FEC code, such as a Reed-Solomon, LDPC or Raptor code. These codes can be constructed as systematic codes. Raptor codes are described in U.S. Patent Application 20030058958, which is incorporated herein by reference. After FEC encoding, each source block is further divided into a plurality of frames or packets referred to herein as source packets. If a systematic code is used, some source packets will contain only an information part and some will contain only a redundant part. In some embodiments, some source packets may contain both an information part and a redundant part. The source packets in the embodiment shown in FIG. 2 have a frame check sequence appended so that the mobile station 100 can determine whether the source packets are correctly received and a header with a unique packet number that can be used to identify correctly and incorrectly received source packets. For example, the data in each source block can be packetized according to the FLUTE protocol being used by the 3GPP standards organization The FLUTE protocol is described in IETF RFC 3926, which is incorporated herein by reference. In other embodiments, the source packets may not have a frame check sequence. The source packets are transmitted over UDP or other protocol to the RAN, mapped into physical layer packets and transmitted to the mobile station over the air interface. In some embodiments, more than one physical layer packet may be required to transmit one source packet so that more than one physical layer packet carries different parts of the same source packet. In other embodiments, a single physical layer packet may be large enough to carry multiple source packets, so that a physical layer packet could contain parts of two or more source packets. FIG. 2 is not intended to imply any particular mapping of source packets to physical layer packets. A frame check sequence and/or FEC coding may be applied to the physical layer packets.

Those skilled in the art will recognize that the source packets may be subject to additional framing and coding before being mapped into physical layer packets. content server These additional protocol layers, shown in FIG. 2 as the mid-level protocol layers, may apply additional framing and coding of the data prior to transmission of the data over the air interface.

Figure 3:
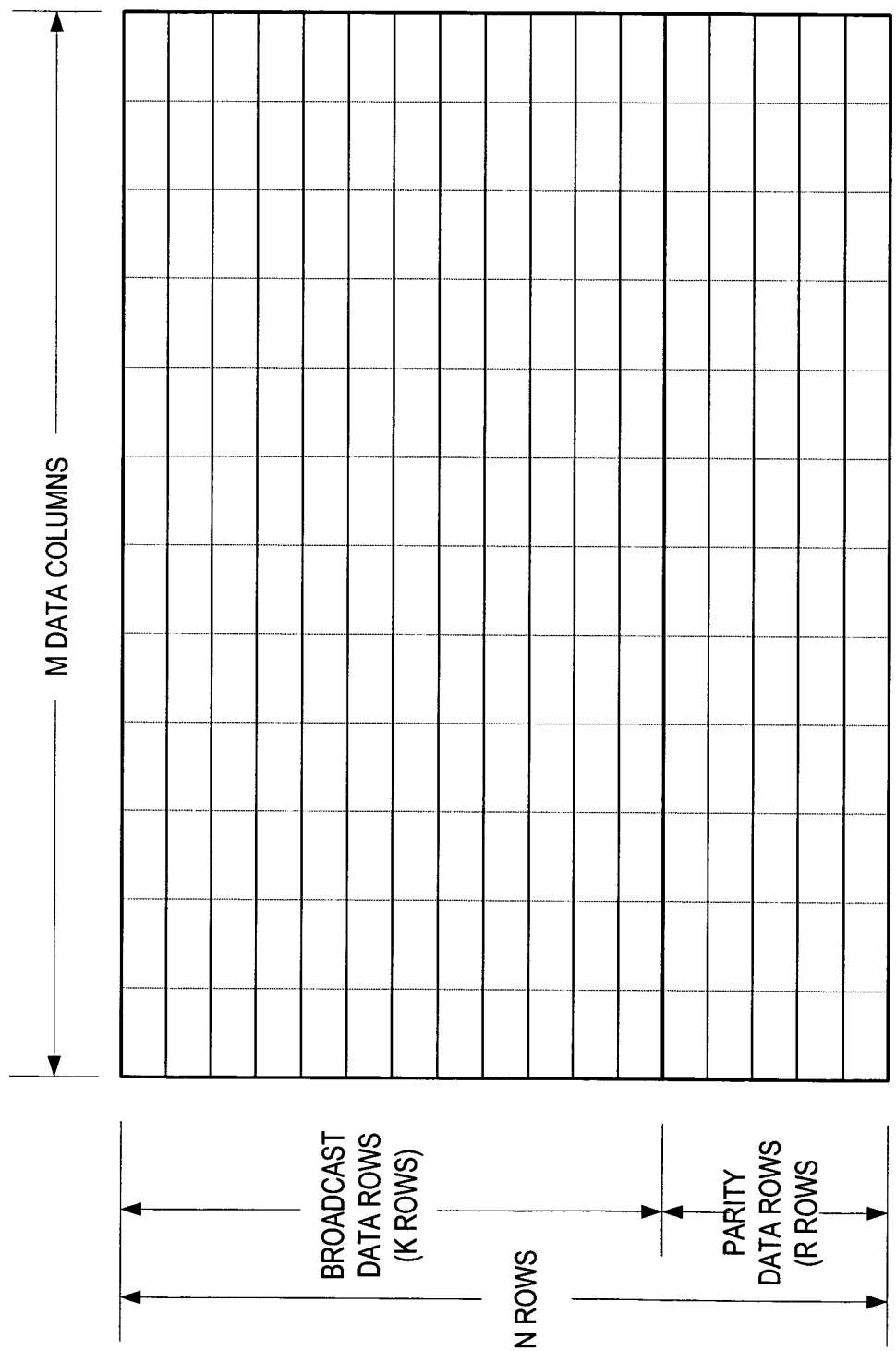
FIG. 3 illustrates an exemplary method for applying a forward error correcting code to a broadcast stream.

FIG. 3 illustrates the encoding applied to the source blocks in one exemplary embodiment. The source data is arranged in columns and rows to form the source blocks. Data enters the source block along rows. After each row is filled, data flows into the next row until K rows are filled. FEC coding is applied to the data along columns and R parity bits or symbols are appended to the end of each column thus adding R rows of redundant data to the source blocks for a total of N rows. Data is pushed out of the encoding block into source packets in rows. Each row of the source block may comprise one or more source packets. As noted above, the source packets may have a frame check sequence appended thereto to enable tracking of frame errors at the mobile station.

The scope of the repair service may correspond to any level of data segmentation. In the embodiment shown in FIGS. 2 and 3, packet-level, row-level or block-level repair services may be offered by the content server 28. If packet-level repair services are provided, the mobile station reports missing source packets in its repair request. If row-level repair services are provided, the mobile station reports missing rows in its repair request. If block-level repair services are provided, the mobile station reports missing source blocks. Packet-level and row-level repair services provide relatively greater repair granularity than block-level repair services at the expense of greater overhead. Block-level repair services provide relatively coarse repair granularity, but can significantly reduce overhead traffic on the uplink because there are fewer source blocks to identify in the repair request. The information contained in the repair requests from the mobile station should be commensurate with the scope or granularity of the repair service. For packet-level repairs, the identification of the missing data should include an object identifier, a block identifier, and a packet identifier. The repair request sent to the transmitter for block-level repair may just be a numeration of the missing source blocks.

As noted above, the data may be subject to further framing and segmentation in lower layer protocols. The scope of repair may rely on these lower layer framing protocols. One potential advantage of offering repair services at lower protocol layers is that the amount of repair data may be reduced. In some systems, errors at the lower protocol layers may propagate and cause an even larger number of errors at higher protocol layers. Therefore, providing repair services in lower protocol layers can significantly reduce the amount of repair data that needs to be transmitted.

When FEC coding is used for the source block, the mobile station may report missing packet after FEC decoding to reduce the amount data that needs to be retransmitted. Also, the content server 28 may not need to retransmit all of the missing data. If the amount of missing data exceeds the error correcting capacity of the FEC coding, the content server 28 may determine the minimum amount of data needed to enable FEC decoding. Thus, if the decoder can tolerate five packet errors and seven source packets are received incorrectly, the content server need only send two source packets in the retransmission.

A potential advantage of repair services over the Broadcast ARQ method is that the repair function can be scheduled such that the uplink channel of the network is not overloaded. For example, each mobile station may generate a random variable that determines when it is allowed to transmit on the uplink channel. Alternatively, the network may schedule the time when each mobile station 100 sends the repair request so that the repair requests are spread out over time. The network may instruct the mobile station 100 to transmit the repair request at a predetermined system time or may instruct the mobile station 100 to transmit the repair request a predetermined time period after the download is complete. The network may transmit a repair parameter that determines the time that the mobile station will send the repair request when the mobile station request a decryption key for the broadcast stream or during authorization. Once the network is made aware of the missing data, it may then instruct the mobile station to go dormant until further notice until the content server 28 is able to deliver the missing data.

There are at least three areas of potential congestion, the uplink (which may be a capacity constrained wireless channel), the fixed network and its transmission nodes, and the content server 28 handling the repair service. A repair service can take into account all potential type of congestions. The repair request is typically shorter than the data that needs to be retransmitted (it may contain the packet number of missing frames, hence this information is typically smaller in size). To avoid a burst of uplink transmissions immediately following the completion of a broadcast, the mobile stations may use a random variable that determines a start time for transmission of repair requests. Once a repair request is received, the network 10 may delay the retransmission of the missing data to avoid congestion on the downlink. The network may then instruct the mobile station to go dormant until the content server 28 is able to deliver the missing data. Thus, the repair transaction may be delayed a relative long time, in particular when the network is broadcasting data (e.g. news clips) to the mobile station during nighttime. The repair function can then be conveniently scheduled to avoid bottlenecks in the overall network. The mobile station may, after it has reported missing data, start to receive other objects on the broadcast channel before the missing data is retransmitted. Therefore, the mobile station may need to correlate the missing data that is retransmitted to a particular object. When the network subsequently sends the repair data, it should identify the transaction as a repair transaction and the object that is subject to the repair transaction.

As the amount of data incorrectly received during download of a data object increases, the size of the repair request sent by the mobile station to the network likewise increases. If the amount of missing data is more than 50 percent of the total, it may be more efficient to report only those segments that were correctly received rather than the segments not received. As the amount of missing data gets closer to 100 percent, repair services may become cumbersome and inefficient. Therefore, the mobile station may consider the download to have failed if the amount of missing data exceeds a predetermined threshold. In one embodiment, the threshold is based on the amount of data needed to successfully decode the broadcast stream. For example, if a rate ½ Reed Solomon code is used, the mobile station need to receive 50% of the source packets in a source block to decode the source block. The repair threshold may be set at 20% of the amount needed to successfully decode the source block, which is the same as 10% of the source packets in a source block. If the mobile station receives less than 10% of the source packets, the mobile station may treat the download as having failed. Typically, the repair threshold is based on the number of remaining errors after decoding, but could also be based on errors before decoding. In the later case, a lower threshold can be set that represents the error correcting capability of the code. The mobile station could then initiate repair if the number of errors is less than the repair threshold, but greater than the lower threshold. The mobile station may inform the user that the download of an object has failed so that the user can attempt another download if available. The user may be given the option to initiate a PTP transaction to download the object.

The repair threshold may be an absolute threshold or a relative threshold. If the download is determined to have failed, the mobile station may, instead of sending a large report identifying all the missing data (or with segments it actually did receive), simply inform the network that the download failed. The network may get an indication of the overall success/failure ratio among all or selected subset of the mobile stations for potential future change of the configuration of the network. There may be some mobile stations that do not need the repair service because they were able to fully reconstruct the object. To enable the network to get accurate statistics on the success/failure ratio, it may advantageous that mobile stations be required to report both failed and successful downloads.

For a small object, the repair threshold used to determine the success/failure of a download may be set such that the mobile station only requests a very small amount of additional data in a PTP repair request. Segment-based repairs can be prohibited for very small files. If the mobile station is unable to reconstruct the object, the object download is considered to have failed and the entire file is downloaded on a PTP channel if the mobile station is still interested in obtaining the object. For small objects, it may be just as efficient to send the entire object in the PTP transaction. For a relatively large file, segment-based repair at the packet-level, row-level or block-level is more beneficial and there is an incentive to keep the correctly-received data and only request the missing data in a repair transaction.

A different repair threshold may be defined for each specific object, e.g. as part of the overall object description (name of object, type of object, size, monetary cost, location of object (e.g. URL), type of FEC code, amount of redundancy in the FEC, organization of the FEC block etc). The object description may be found on a web page associated with the broadcast service. The object description, or only the threshold, may be sent to the mobile station outside the broadcast channel (i.e. a PTP channel), before the download broadcast begins. Alternatively, the object description may be sent along with the object itself on the broadcast channel.

During download of an object, the mobile station may predict whether the repair threshold will be reached. If it appears that the repair threshold will not be reached, the mobile station can abort the download and save power, rather than continue a download that is unlikely to be successful. If the download is stopped before the object download is complete, the mobile station may also inform the user that it has aborted the download and the user may elect whether to restart the download.

One simple prediction metric is to track the error rate at the same level that repair services are offered. For example, packet-level repair services may be used to retransmit missing source packets as shown in FIG. 2. The source packets include a frame check sequence, such as a CRC, that enables detection of erroneous packets by the mobile station. Thus, the mobile station can request retransmission of any source packet if the source packet is not correctly received in a repair request. The mobile station counts the number of correctly and incorrectly received source packets as the source packets are reassembled and computes an error rate. Based on the computed error rate, the mobile station can predict whether the defined threshold for determining the success/failure of the download will be reached. The prediction should preferably allow for some margin of error. Continuing the example started in paragraph 35, if the threshold for declaring the download a failure is 10% of the source packets and the error margin is 5%, the mobile station may preemptively declare a download failure before the download is complete if the error rate, i.e., the number of erroneously received source packets, exceeds 95%.

In some embodiments, the repair threshold may be an absolute value. The absolute value may be expressed as the minimum number of source packets or the minimum amount of data that must be received before repair services can be invoked. For example, if the minimum threshold for invoking the repair service is 10,000 correctly received source packets, the mobile station can predict whether the minimum number of source packets will be received based on the error rate and the size of the download object. For a download object contained in 100,000 source packets, and considering an error margin of 5%, the mobile station 100 may abort the download if more than 95,000 packet errors are predicted.

The mobile station may wait for the download to progress a predetermined amount before it starts computing the prediction metric. For example, the mobile station may wait until the download is at least 10% complete before it makes a prediction. One reason for delaying is that the prediction of a download failure may not be reliable early in the download when the mobile station has only a small amount of data to use. Another reason is that channel conditions could improve as the download continues so aborting the download to early may not be efficient.

The error margin for the prediction metric can be adjusted during the course of the download. For example, a high error margin for the prediction metric can be used early in the download and get smaller as the download progresses. In other embodiments, the error margin for the prediction metric may by adapted depending on changes in channel conditions. The mobile station can monitor a channel quality metric such as received-signal strength, C/I or Eb/N0 and other known channel quality estimates. A sudden change in any of these channel quality estimates indicates that the mobile station has moved into a relatively more or relatively less favorable position. These measurements may feed into the adaptive setting of the error margin. For example, the error margin may be increased when as channel conditions deteriorate with the expectation that channel conditions will improve before the download is complete. The channel quality estimate for adjusting the error margin may be a time-averaged or filtered value.

With systematic codes, the receiver can attempt to reassemble the broadcast content before decoding the source blocks. If there are very few transmission errors, many of the source packets will also be error free and the broadcast content contained in those source packets can be reassembled before the outer FEC decoding takes place. Thus, the prediction metric used in this case may be a running measurement of the error rate for the source frames before outer decoding.

If the source object is divided into multiple source blocks as shown in FIG. 2 and each source block is independently FEC encoded, the error metric used to predict download failures can be computed after outer decoding. In some circumstances, outer decoding may be completely successful in spite of some errors in the source packets. In this case, no repair will be required. Even if outer decoding fails, some of the errors in the source packets may nevertheless be corrected, thus reducing the number of source packets that are subject to repair. For example, if there are 10 source blocks, the mobile station may make a prediction after decoding each source block. Computing the prediction metric only once per source block may be a convenient procedure and provide sufficient degree of time granularity. This allows sufficient time and battery power saving for an object download process that is received with too low quality. Thus, the mobile station may stop further reception after the first source block is processed, i.e. after 10% of the broadcast event is passed.

Preferably, the error metric used to predict download failures corresponds with the scope or granularity of the repair. Thus, if the repair service is offered at the frame level, the error metric may comprise a frame error rate. As noted above, the frame error rate may be computed either before or after higher level decoding. For block level repairs, the error metric can be based on the number of incorrectly received blocks. However, it is not required that the granularity of the error metric correspond to the repair granularity. For example, a frame error rate can be used as an error metric to predict download failures for block level repairs. Similarly, an error metric computed at lower protocol levels may be used to predict download failures for a frame level repairs. For example, when errors propagate to higher level protocols in a deterministic manner, an error metric for the physical layer packets may be computed and used to predict download failures.

The object description sent to the mobile station before or during the download event may include information whether users subscribing to the broadcast service are eligible for a free or cost reduced PTP download. The user may configure the mobile station to automatically perform a repair services if there is no extra charge or a very small extra charge. The mobile station reads this information in the object description, fetches user preferences entered by the user and/or stored in the mobile station and, based on these two indications, may or may not use the repair service. Furthermore, since the use of PTP channels is typically charged, although not always based on the amount of content, the repair service may also charge for the use of this channel. Whether there is a charge for repair services can be announced in the object description. The mobile station may be programmed to first inform the user before initiating a request for a repair service if there is extra cost involved.

Figure 4:
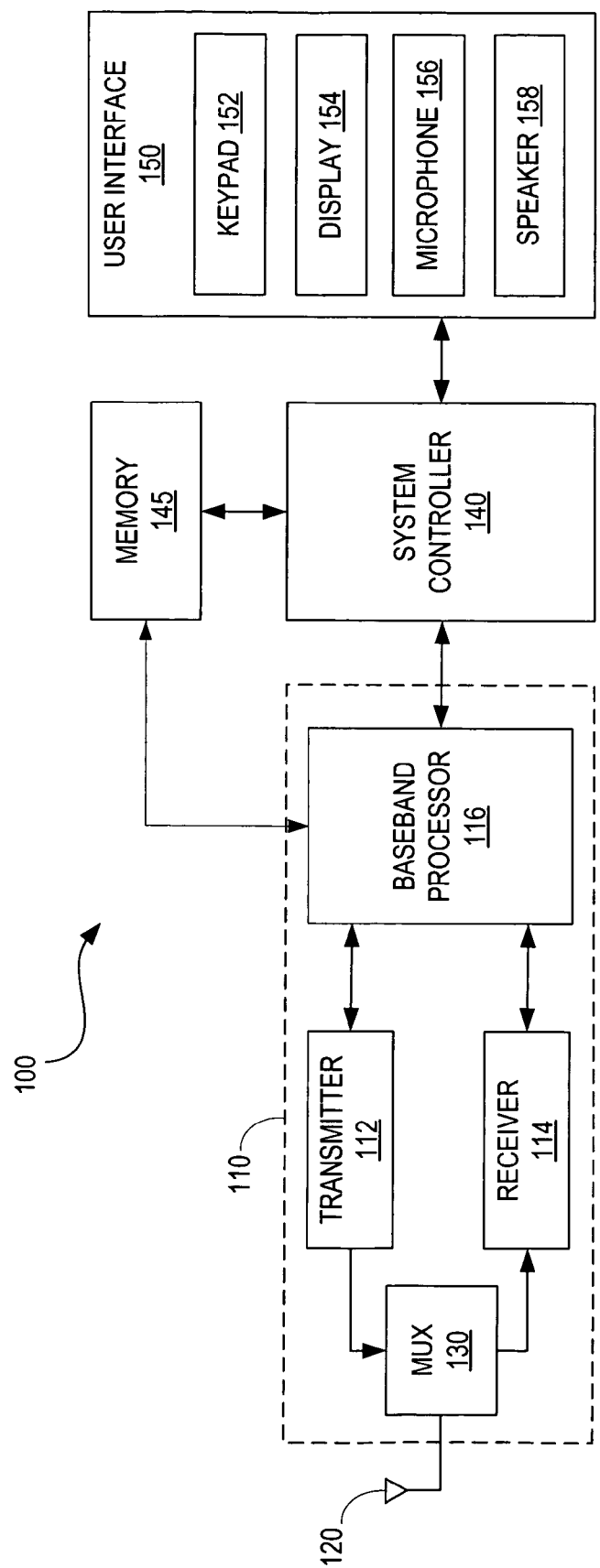
FIG. 4 illustrates an exemplary mobile station.

FIG. 4 illustrates an exemplary mobile station 100 according to one embodiment of the present invention. As used herein, the term "mobile station" may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

Mobile station 100 includes a transceiver 110 connected to an antenna 120 via a multiplexer 130 as known in the art. Mobile station 100 further includes a system controller 140, memory 145, and a user interface 150. Transceiver 110 includes a transmitter 112 to transmit signals to mobile stations 100, a receiver 114 to receive signals from mobile stations 100, and a baseband processor 116. Transceiver 110 may, for example, operate according to the cdma2000, WCDMA, GSM/GPRS, WIMAX and DVB-H standards. The present invention, however, is not limited to use with these standards and those skilled in the art will recognize the present invention may be extended or modified for other standards. Transceiver includes baseband processing circuits for processing signals transmitted and received by the mobile station 100.

System controller 140 provides overall operational control for the mobile station 100 according to programs instructions stored in memory 145. System controller 140 may comprise one or more microprocessors or microcontrollers and may be part of an application specific integrated circuit (ASIC). Memory 145 represents the entire hierarchy of memory in a mobile station 100. Memory 145 provides storage for data, operating system programs and application programs. Memory 145 may be integrated with the system controller 140, or may be implemented in one or more discrete memory devices.

User interface 150 comprises input device such as a keypad 152, display 154, microphone 156 and speaker 158. Input device 152 and display 154 allows the operator to interact with the mobile station 100. Microphone 156 converts the operator's speech into electrical audio signals and speaker 158 converts audio signals into audible signals that can be heard by the operator. It will be understood by those skilled in the art that mobile station 100 may comprise a subset of the illustrated user interface elements, or mobile station 100 may comprise additional user interface elements not shown or described herein.

The baseband processor 116 in the transceiver coordinates with the system controller to perform the repair function as described herein. The baseband processor 116 decodes the received signals and determines whether frames or other segments are received correctly. Incorrectly received frames are reported to the system controller 140, which generates a repair request. The system controller 140 is responsible for initiating, maintaining and terminating repair transactions. System controller 140 and/or the baseband processor 116 can perform the function of predicting download failures and aborting the download.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method implemented by a mobile station of repairing a download object comprising a plurality of packets containing encoded data, said method comprising:

downloading a plurality of packets in said download object;

setting a repair threshold for the download object, the repair threshold indicating a minimum amount of correctly received data in the download object needed to invoke repair of the download object;

if the amount of correctly received data in the download object is greater than the repair threshold:

sending a repair request to initiate retransmission of repair data;

receiving said repair data responsive to said repair request; and decoding said download object after receiving said repair data; and if the amount of correctly received data in the received download object is less than the threshold, declaring a download failure and restarting said download of said download object.

2. The method of claim 1 further comprising disabling repair if the download object is less than a predetermined size.

3. The method of claim 1 wherein the repair threshold is transmitted to the mobile station over a point-to-point channel.

4. The method of claim 1 wherein the repair threshold is transmitted to the mobile station over the broadcast channel.

5. The method of claim 1 wherein the repair threshold is transmitted separately from the download object before the downloading begins.

6. The method of claim 1 wherein the repair threshold is transmitted with the download object.

7. The method of claim 1 further comprising sending a repair request identifying incorrectly received data.

8. The method of claim 7 further comprising sending a repair request identifying correctly received data if the incorrectly received data exceeds a predetermined amount.

9. The method of claim 1 further comprising predicting a download failure before downloading is complete based on an error metric.

10. The method of claim 9 further comprising aborting the download if a download failure is predicted.

11. The method of claim 9 wherein the granularity of the error metric corresponds to the granularity of the repair.

12. The method of claim 11 wherein a repair segment comprises one source block of the download object and wherein the error metric for predicting download failures is based on the amount of incorrectly received blocks.

13. The method of claim 11 wherein a repair segment comprises one row in one source block of the download object and wherein the error metric for predicting download failures is based on the number of incorrectly received rows.

14. The method of claim 11 wherein a repair segment comprises one frame and wherein the error metric for predicting download failures is based on the number of incorrectly received frames.

15. The method of claim 14 wherein a plurality of frames comprise one encoding block that is encoded using an error correcting code.

16. The method of claim 15 wherein the number of incorrectly received frames is determined before decoding the source block to correct frame errors.

17. The method of claim 15 wherein the number of incorrectly received frames is determined after decoding the source block to correct frame errors.

18. The method of claim 9 wherein the granularity of the error metric differs from the granularity of the repair.

19. The method of claim 18 wherein a repair segment comprises one block, which is further divided into sub-segments, and wherein the error metric for predicting download failures is based on the number of incorrectly received sub-segments.

20. The method of claim 19 wherein the sub-segments comprise rows in said block, and wherein the error metric is based on the number of incorrectly received rows.

21. The method of claim 19 wherein the sub-segments comprise frames, and wherein the error metric is based on the number of incorrectly received frames.

22. The method of claim 21 wherein the block is coded using an error correcting code and wherein the number of incorrectly received frames is determined before decoding the block to correct frame errors.

23. The method of claim 21 wherein the block is coded using an error correcting code and wherein the number of incorrectly received frames is determined after decoding the block to correct frame errors.

24. The method of claim 18 wherein repairs are based on data segmentation at a first protocol layer, and wherein the error metric for predicting download failures is computed in a second protocol layer below the first protocol layer.

25. The method of claim 9 wherein the predicting download failures based on an error metric comprises predicting the amount of expected errors based on a measured error rate and comparing the expected errors to the repair threshold.

26. The method of claim 25 further comprising adjusting one of the expected errors and the repair threshold by an error margin before comparing the expected errors to the repair threshold.

27. The method of claim 26 wherein the error margin varies as the download of the progresses.

28. The method of claim 26 wherein the error margin is reduced as the download of the progresses.

29. The method of claim 26 wherein the error margin is adapted responsive to changes in channel conditions.

30. A mobile station comprising:
a transceiver for downloading a download object comprising a plurality of packets containing encoded data; and
a controller operative to:
if an amount of correctly received data in the download object is greater than a repair threshold, send a repair request to initiate retransmission of repair data, receive said repair data responsive to said retransmission request, and decode said download object after receiving said repair data;
if the amount of correctly received data in the received download object is less than the threshold, declare a download failure and restart said download;
wherein the repair threshold indicates on a minimum amount of correctly received data needed to invoke repair of the download object.

31. The mobile station of claim 30 wherein the controller is further operative to disable repair if the download object is less than a predetermined size.

32. The mobile station of claim 30 wherein the mobile station receives the repair threshold over a point-to-point channel.

33. The mobile station of claim 30 wherein the mobile station receives the repair threshold over a broadcast channel.

34. The mobile station of claim 30 wherein the repair threshold is received separately from the download object before the downloading begins.

35. The mobile station of claim 30 wherein the repair threshold is received with the download object.

36. The mobile station of claim 30 wherein the controller is operative to generate and identifying incorrectly received data.

37. The mobile station of claim 36 wherein the controller is operative to send a repair request identifying correctly received data if the incorrectly received data exceeds a predetermined amount.

38. The mobile station of claim 30 wherein the controller is operative to predict a download failure before downloading is complete based on an error metric.

39. The mobile station of claim 38 further wherein the controller is operative to abort the download if a download failure is predicted.

40. The mobile station of claim 38 wherein the granularity of the error metric corresponds to the granularity of a repair segment.

41. The mobile station of claim 40 wherein a repair segment comprises one source block of the download object and wherein the error metric for predicting download failures is based on the amount of incorrectly received source blocks.

42. The mobile station of claim 40 wherein a repair segment comprises one row in one source block of the download object and wherein the error metric for predicting download failures is based on the number of incorrectly received rows.

43. The mobile station of claim 40 wherein a repair segment comprises one frame and wherein the error metric for predicting download failures is based on the number of incorrectly received frames.

44. The mobile station of claim 43 wherein a plurality of frames comprise one encoding block that is encoded using an error correcting code.

45. The mobile station of claim 44 wherein the number of incorrectly received frames is determined before decoding the source block to correct frame errors.

46. The mobile station of claim 44 wherein the number of incorrectly received frames is determined after decoding the source block to correct frame errors.

47. The mobile station of claim 38 wherein the granularity of the error metric differs from the granularity of a repair segment.

48. The mobile station of claim 47 wherein a repair segment comprises one block, which is further divided into sub-segments, and wherein the error metric for predicting download failures is based on the number of incorrectly received sub-segments.

49. The mobile station of claim 48 wherein the sub-segments comprise rows in said block, and wherein the error metric is based on the number of incorrectly received rows.

50. The mobile station of claim 48 wherein the sub-segments comprise frames, and wherein the error metric is based on the number of incorrectly received frames.

51. The mobile station of claim 50 wherein the block is coded using an error correcting code and wherein the number of incorrectly received frames is determined before decoding the block to correct frame errors.

52. The mobile station of claim 50 wherein the block is coded using an error correcting code and wherein the number of incorrectly received frames is determined after decoding the block to correct frame errors.

53. The mobile station of claim 47 wherein repairs are based on data segmentation at a first protocol layer, and wherein the error metric for predicting download failures is computed in a second protocol layer below the first protocol layer.

54. The mobile station of claim 38 wherein the predicting download failures based on an error metric comprises predicting the amount of expected errors based on a measured error rate and comparing the expected errors to the repair threshold.

55. The mobile station of claim 54 further comprising adjusting one of the expected errors and the repair threshold by an error margin before comparing the expected errors to the repair threshold.

56. The mobile station of claim 55 wherein the error margin varies as the download of the progresses.

57. The mobile station of claim 55 wherein the error margin is reduced as the download of the progresses.

58. The mobile station of claim 55 wherein the error margin is adapted responsive to changes in channel conditions.

* * * * *